United States Patent
Pruden et al.

[11] Patent Number: 6,137,082
[45] Date of Patent: Oct. 24, 2000

[54] MULTIPLE PIECE PROPELLER DEICING SYSTEM BRUSH BLOCK HOUSINGS

[75] Inventors: Robert W. Pruden, Enfield; Daniel J. Madar, Somers, both of Conn.

[73] Assignee: United Technologies Corporation, Windsor Locks, Conn.

[21] Appl. No.: 09/087,076

[22] Filed: May 29, 1998

[51] Int. Cl.[7] .................................................. H05B 1/00
[52] U.S. Cl. ........................ 219/201; 219/202; 219/541; 244/134; 310/239
[58] Field of Search ..................... 219/200, 201, 219/531, 541; 244/134, 134 D; 310/90, 239, 242, 247, 178

[56] References Cited

U.S. PATENT DOCUMENTS

| | | | |
|---|---|---|---|
| 3,387,155 | 6/1968 | Krulls | 310/239 |
| 3,644,703 | 2/1972 | Nelson | 219/201 |
| 3,657,514 | 4/1972 | Adams | 219/201 |
| 4,136,295 | 1/1979 | Sweet | 310/239 |
| 4,386,749 | 6/1983 | Sweet et al. | 244/134 D |
| 4,686,405 | 8/1987 | McKee | 310/178 |
| 4,746,828 | 5/1988 | Nado et al. | 310/90 |
| 5,509,625 | 4/1996 | Oulette et al. | 244/134 |
| 5,767,605 | 6/1998 | Giamati | 310/239 |
| 5,949,175 | 9/1999 | Cummins | 310/239 |

*Primary Examiner*—Teresa Walberg
*Assistant Examiner*—Leonid Fastovsky
*Attorney, Agent, or Firm*—Dominic J. Chiantera; Moore & Van Allen, PLLC

[57] ABSTRACT

A brush block assembly, for providing stationary mounting of electrically conductive brushes in contact registration with associated slip rings of a rotating interface, comprises a main housing adapted for mounting in proximity to the rotating interface and having a recess portion for releasably engaging a brush holder, and a brush holder formed from a thermoplastic molding compound comprising an organic polytetrafluoroethylene (PTFE) filler distributed within a polyetheretherketone (PEEK) thermoplastic resin, for securing the brushes within the recess in contact registration with their associated slip rings.

12 Claims, 5 Drawing Sheets

MULTIPLE PIECE PROPELLER DEICING SYSTEM BRUSH BLOCK HOUSINGS

CROSS REFERENCE TO RELATED APPLICATIONS

Some of the information disclosed in this application is disclosed and claimed in a commonly owned, co-pending application entitled: Brush Block Housing for Propeller Deicing System, Ser. No. 09/087,308 filed on even date herewith by Marc E. Gage et al.

1. Technical Field

This invention relates to aircraft propeller deicing systems, and more particularly to brush block assemblies for use in propeller deicing systems.

2. Background Art

As known, propeller deicing systems are used to prevent ice build-up on the airfoil surfaces of an aircraft's propeller blades. The most common type deicing system uses resistive heating elements in the form of flexible strips which are disposed, typically bonded by adhesive, along a section of the blade's leading edge closest to the hub assembly. The application of electrical current to the heaters weakens the bond between accumulated ice and the airfoil surface allowing the ice to be "thrown off" by the centrifugal forces generated by rotation of the propeller.

An aircraft power source located on the non-rotating side of the propeller-engine interface provides electrical current to the heaters through a rotating interface comprising stationary, electrically conductive brushes which are in electrical contact with associated ones of a plurality of electrically conductive slip rings mounted to the rear of the rotating propeller's spinner assembly. The brushes, typically a graphite composition, are each mounted in individual brush pockets, i.e. the chamber which houses the brush, which are formed within a brush block housing assembly. The pockets spatially position the brushes in a manner which provides mechanical contact between a first contact end of the brush body's longitudinal axis and the associated slip ring surface. Each of the brushes are spring loaded to force the contact end into mechanical and, therefore, electrical contact with the slip ring surface. The distal, or opposite end of each brush is electrically connected to the power source.

Since the brushes are electrically conductive the brush pockets must electrically insulate the brush body from other conductive elements to prevent current leakage or shorting of the power source. This is accomplished by fabricating the pockets and the brush block housing itself from an insulating material. The prior art materials used are typically thermosetting compounds, such as diallylphthalate (DAP) resin or epoxy, which is injection molded into a die molding of the housing. The resin and the epoxy each have an inorganic filler, such as glass fiber, which is distributed within them and which provides good electrical insulating qualities. The glass filler, however, is abrasive to the brush graphite composition. Since the brush pocket dimensions are held to a tight tolerance to provide suitable mechanical support to the brush body, there is contact between the surfaces of the brush body and the pocket walls.

Due to the frictional forces of the rotating slip ring surface and the graphite composition nature of the brushes, the contact end of the brushes wear down with use. This is an acceptable characteristic of the rotating interface in which the brushes are designed to be a consumable element of the deicing system. Ideally the brush wear would occur exclusively on the contact end surface and brush life would be a function of brush length. However, the glass filler contained within the pocket wall material prior art brush block housings abrades the brush body whenever there is brush motion within the pocket, creating non-functional wear of the brush separate from erosion of the contact surface.

This non-functional wear results from tolerances in the slip ring and/or the hub assembly which produce a degree of undulation of the slip ring surface that cyclically forces the brush back into the pocket. The cyclic displacement is opposed by the spring force causing the brush to reciprocate within the pocket at the operating RPM of the propeller shaft. The reciprocal motion coupled with the side loading caused by the surface friction and the direction of rotation of the slip ring, abrades the side loaded surface of the brush along its length as it runs across the glass impregnated wall surface of the pocket. This produces a carbon powder residue which mixes with surface oil from the engine (the brush housing assembly is mounted to the engine gearbox) to create a sludge within the pocket.

The effect of a sludge build-up in the pocket is to limit free motion of the brush within the pocket thereby reducing the effectiveness of the spring load. In the worst case the sludge can tighten the brush within the pocket to the extent that the spring force can no longer force the contact end onto the surface of the slip ring, thereby preventing current flow across the surface. More typically the cyclic displacement and the sludge build-up produce periodic gaps between the contact end and the slip ring surface resulting in electrical arcing. Arcing produces rapid deterioration of the housing pockets, the brush contact end surface, and the slip ring surface. The erosion of the pocket wall creates unwanted brush mobility, resulting in further abrasion and wear, further sludge build-up, and further arcing. The result is premature brush and housing replacement. The overall effect being higher maintenance costs.

DISCLOSURE OF INVENTION

One object of the present invention is to provide an improved brush block assembly to both minimize non-functional abrasion of the brushes, thereby extending the functional brush life, and to reduce the cost of the assembly. Another object of the present invention is to provide a new brush housing configuration which allows replacement of the high wear brush block portion without replacement of the entire assembly, thereby extending the useful life of the assembly and reducing maintenance costs.

According to the present invention, a brush block assembly comprises a main housing and a removable brush holder insert, the main housing having material characteristics which are selectable in dependence on that necessary to provide stationary mounting of the main housing in proximity to slip rings disposed on the rotational interface, and having a recess portion adapted to receive the brush holder insert in a releasably engaging manner, the brush holder being formed from a thermoplastic molding compound comprising an organic polytetrafluoroethylene PTFE) filler distributed within a polyetheretherketone (PEEK) thermoplastic resin, and being adapted to secure, when engaged in the recess portion, one or more electrically conductive brush elements in contact registration with the surface of an associated one of the slip rings.

In further accord with the present invention, .the brush holder molding compound contains PTFE at a level of from 5% to 50% by weight. In still further accord with the present invention, the preferred range of composition of the PTFE within the molding compound is from 15% to 40% by weight. In yet still further accord with the present invention, the brush holder molding compound comprises 30% PTFE filled PEEK. In yet still further accord with the present invention, the molding compound comprises 20% PTFE filled PEEK.

The PEEK compound has naturally good wear characteristics while PTFE (commonly referred to as TEFLON, a registered trademark of the Dupont Corporation) provides additional lubrication to any wear surfaces that may occur within the brush pocket, thereby minimizing further erosion. Further desirable characteristics of the PTFE filled PEEK molding compound are good chemical resistance, temperature resistance, and strength.

The present brush holder material was selected for its combination of good electrical insulating capability and good mechanical wear characteristics, while the main housing material may be an alternative, non-insulating material chosen for its suitable structural strength. This reduces the cost of the overall assembly by limiting the use of the more expensive PTFE filled PEEK to that portion of the assembly which houses the brushes. Similarly, since the brush holder insert is removable, it is replaceable separate from the main housing, thereby reducing maintenance costs.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
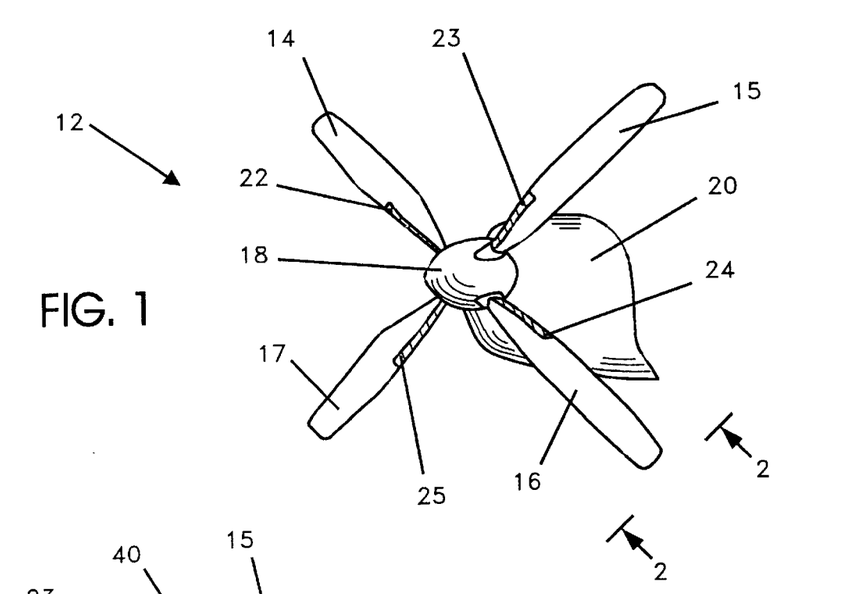
FIG. 1 is a perspective illustration of a propeller assembly in which the present invention may be used.

The best mode embodiment of the invention is described with respect to a four blade propeller assembly 12, as shown in FIG. 1. It should be understood, however, that the present invention may be used with any multi-bladed propeller assembly, with the number of the propeller blades determining the number of brushes used, as will become evident with the following detailed description.

The illustrated propeller assembly of FIG. 1 includes four propeller blades 14–17 which are radially spaced 90° on center on a spinner assembly 18. The assembly is mounted to an engine (not shown) having an engine cowling 20. The blades 14–17 are typically a composite material, and include heating elements 22–25 disposed on the leading edges of the blades 14–17. In the present embodiment, the heating elements are resistive element heaters of a known type. It should be understood, however, that the heater elements may be of any known type deemed suitable by those skilled in the art for a particular propeller assembly application.

Figure 2:
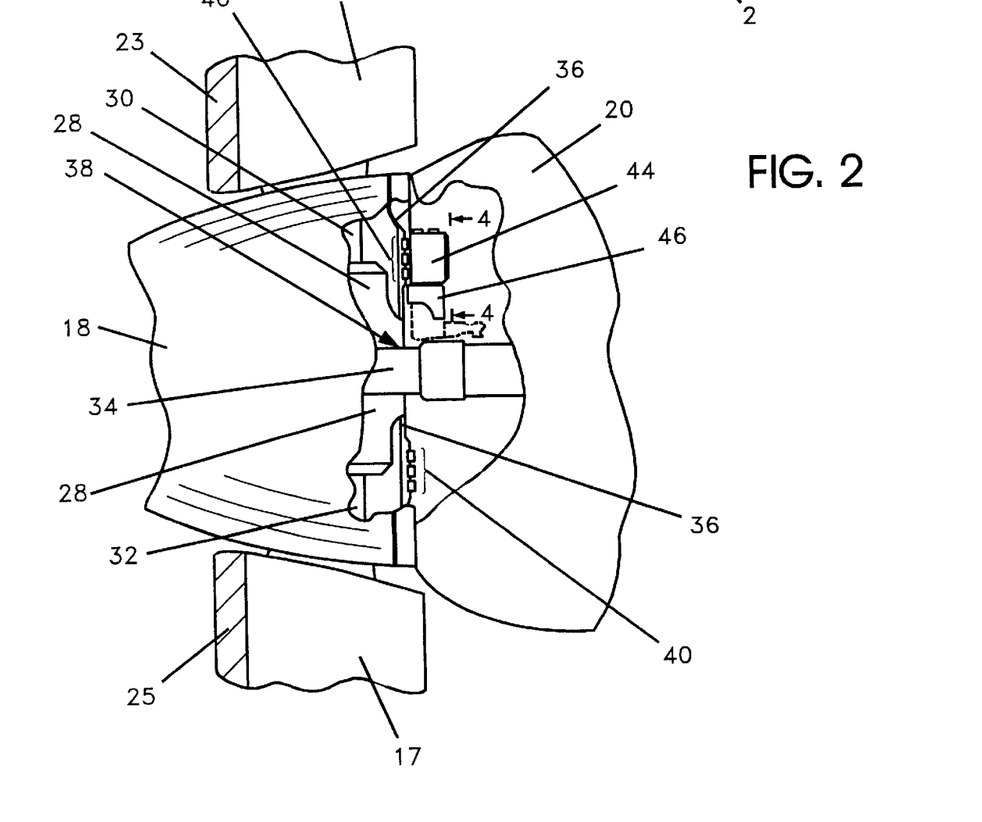
FIG. 2, is a partial section, with partial reveal, of one portion of the assembly of FIG. 1.

Referring now to FIG. 2, in a simplified, partially revealed section taken along the line 2—2 of FIG. 1, the spinner 18 encloses a hub assembly 28 which mechanically secures the spars of the propeller blades 14–17 to the engine shaft 34, as shown for the spars 30, 32 of the blades 15, 17. The rearward interior portion of the spinner, that facing the engine cowling 20, includes a bulk head 36 which is fastened along the interior periphery of the spinner and the aft surface of the hub. The bulk head 36 is both substantially flat and substantially annular in its geometry, and includes a center hole 38 through which the engine shaft 34 connects to the hub assembly 28.

The exposed surface of the bulk head includes a substantially annular portion formation of electrically insulated material having disposed therein one or more concentric, annular slip rings 40. Typically the bulkhead comprises a molded plastic composition having pre-molded grooves adapted to receive the slip rings, which are bonded into the grooves with an epoxy adhesive or resin. The slip rings, which are preferably copper, each include an electrical contact, which may comprise a bolt, that is attached, as by soldering, to the underside surface of the slip ring. The contact projects through the bulkhead to the side opposite the slip rings, i.e. the side toward the propeller, and provides a junction to which the heaters may be connected through electrically conductive wires. Electrical current is provided to the slip rings through carbon-brushes (not visible in FIG. 2) mounted within a brush block assembly 44, which is mounted by bracket assembly 43 and bolts 45 to the non-rotating side of the propulsion system.

Figure 3:
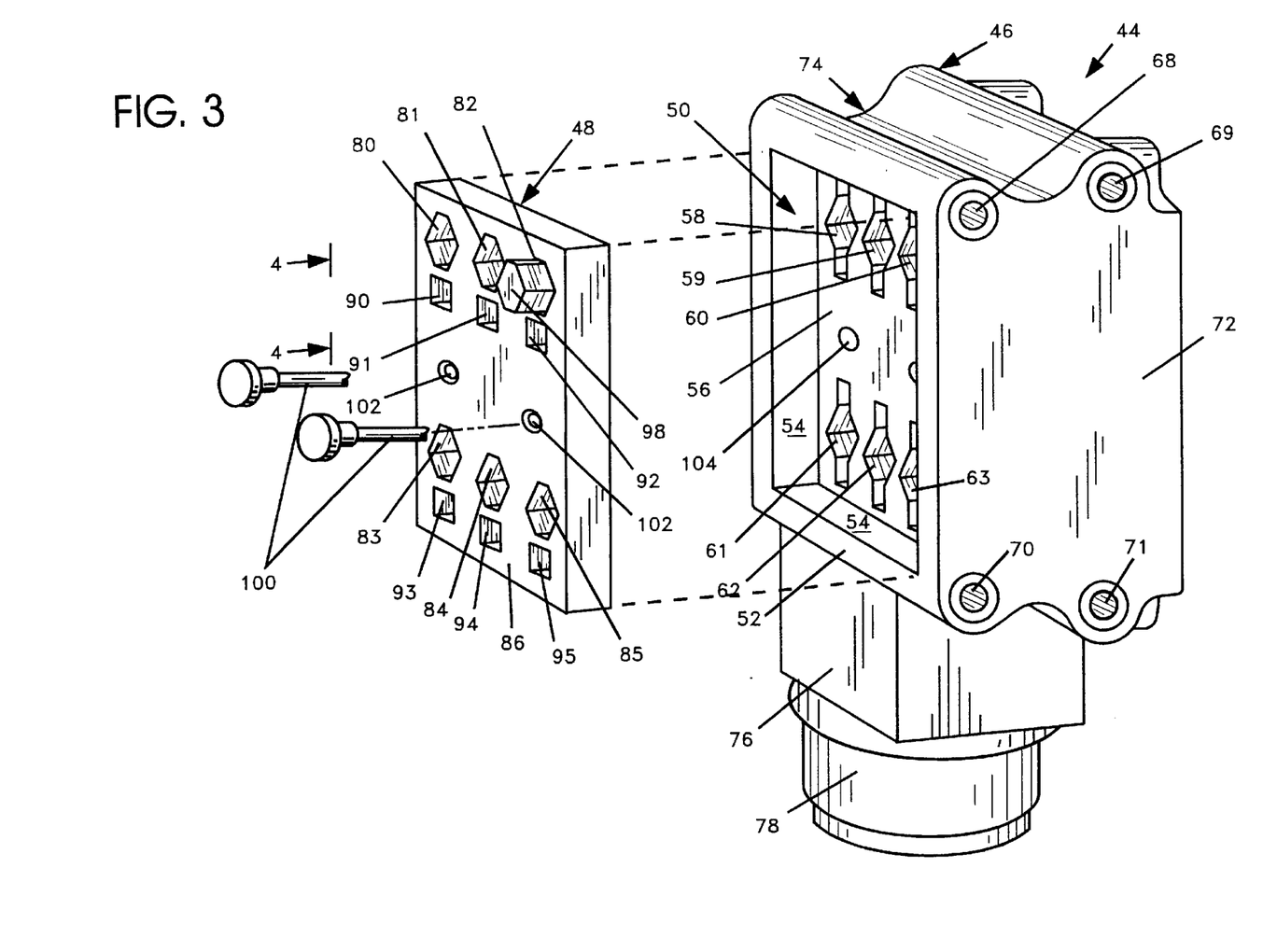
FIG. 3, is a perspective illustration of one view of the brush block assembly of the present invention.
Figure 4:
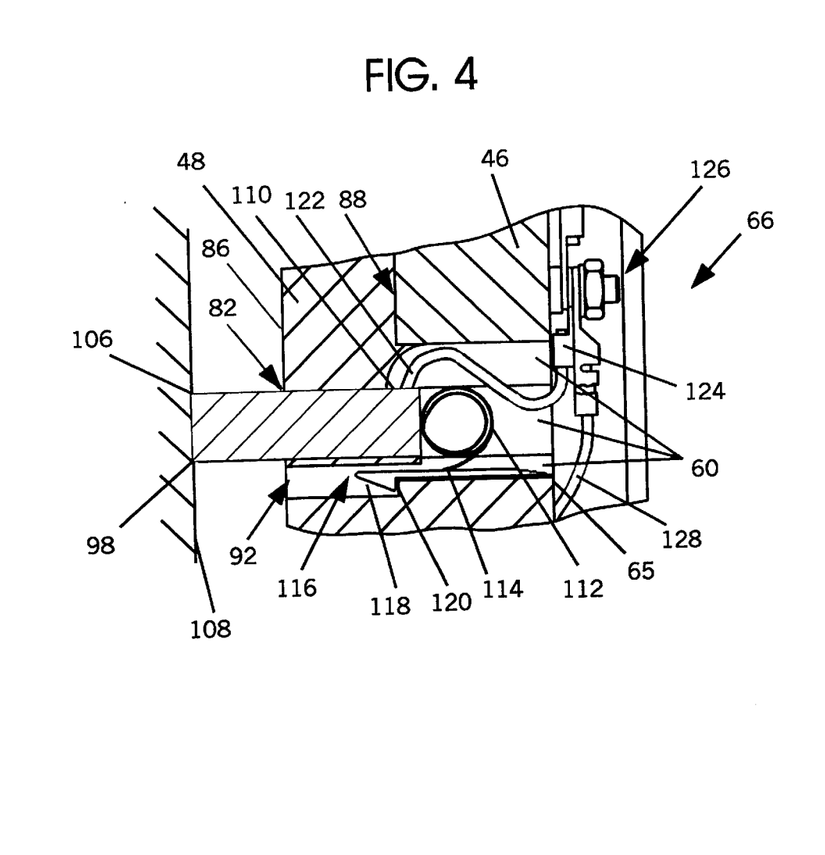
FIG. 4, is a sectioned view of one portion of the assembly of FIG. 3.
Figure 5A:
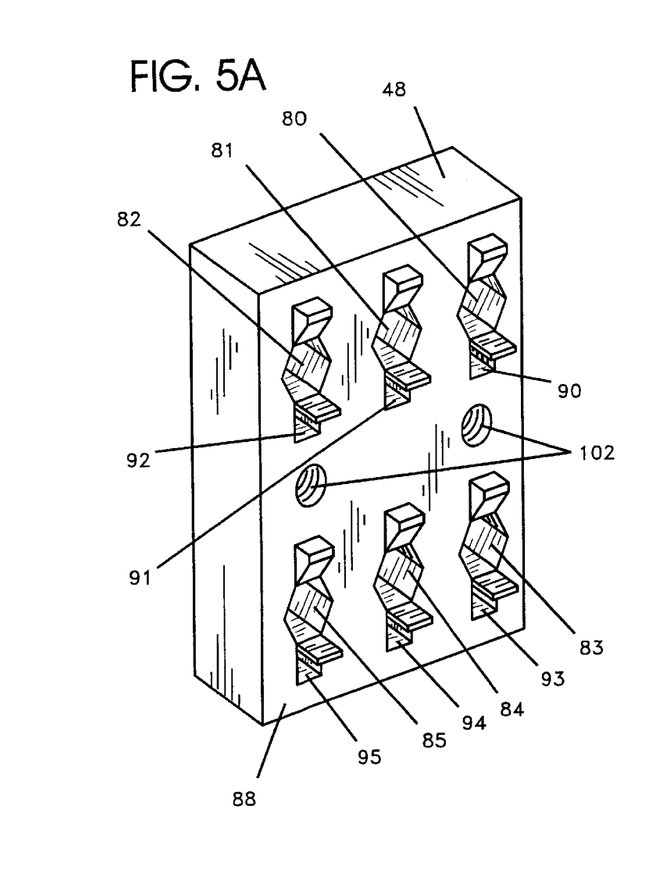
FIG. 5, is a perspective illustration of a second view of the brush block housing of the present invention.
Figure 5B:
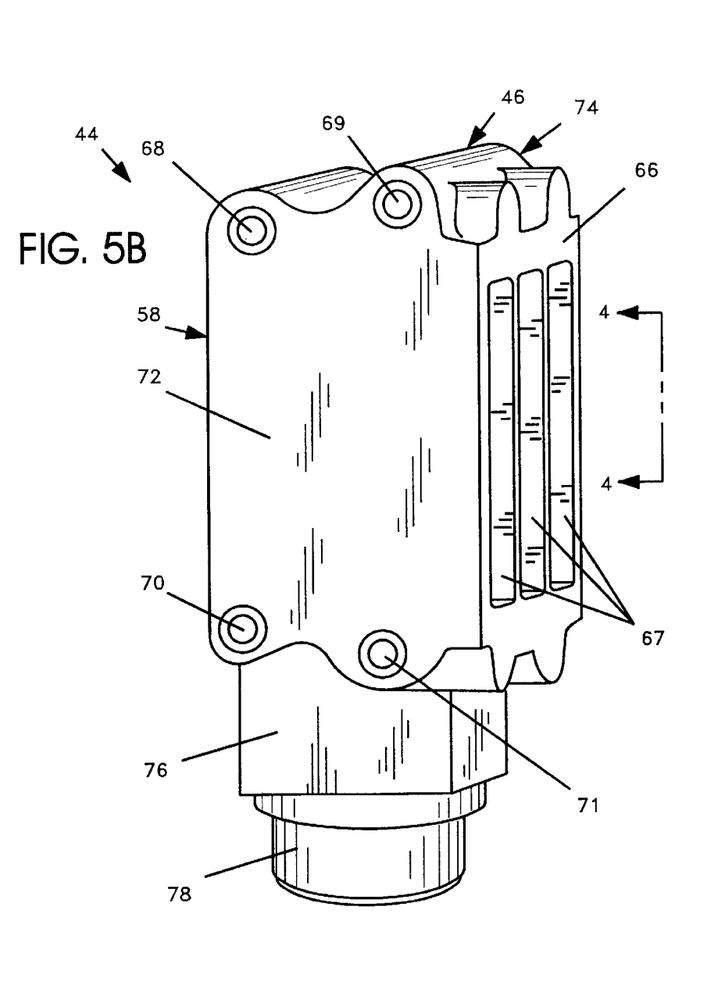

Referring now to FIGS. 3 and 5, which are alternate view, perspective illustrations of the brush block assembly 44 disassembled into its constituent subassemblies of a main housing 46 and a brush holder 48. The main housing 46 includes a recess portion 50 formed in an interface side 52 of the housing. In the present embodiment the recess portion has a substantially rectangular geometry with side walls 54 and a backplate 56. The backplate includes a matrix array (two rows, three columns) of keyways 58–63 which, as described in greater detail in FIG. 4, are formed through the main housing from the backplate 56 to a terminal surface 65 which is set back from the connection surface 66 (FIG. 5) of the housing by a plurality of connection recesses 67. Each column of keyways is terminated at the terminal surface 65 which is in the bottom, or valley of an associated one of a plurality of connection recesses 67. As shown clearly in FIG. 4 the recesses 67 provide a protective enclosure for electrical connections associated with each keyway.

The shape geometry of the main housing 46 is determined by the requirements of the particular engine and/or aircraft model type, as that required to provide secure mounting of the housing and the brush block subassembly 48 on the non-rotating side of the propulsion system. The main housing includes mounting holes 68–71 which, in the present embodiment, pass through the housing from a first side surface 72 to an opposite side surface 74, in a direction transverse to the housing's interface surface 52. The mounting holes 68–71 allow bolts or other suitable fasteners to be used to secure the first surface 72 to a mating surface of the bracket 43 (FIG. 2) in a manner which places the interface 52 in spatial proximity to the slip rings 40 (FIG. 2). The present main housing also includes a pedestal portion 76 which houses an electrical connector 78. The connector provides the input/output signal interface between the assembly 44 and the associated on-board equipment, including the power source.

Preferably, the main housing is formed by injection molding, which allows accurate control of the molded housing's dimensions and shape. The injection molding process selected, and the equipment used to perform the process, may be any of those known processes deemed suitable by those skilled in the art. Similarly, the material characteristics, i.e. the molding compound used to form the housing, is selectable from among a number of known compounds as may be deemed suitable for use by those skilled in the art to provide the structural strength necessary for stationary mounting of the assembly in proximity to the rotational interface.

The brush holder 48 is also a molded assembly; preferably injection molded to form a substantially monolithic structure comprising a thermoplastic molding compound material having an organic polytetrafluoroethylene (PTFE) filler distributed within a polyetheretherketone (PEEK) thermoplastic resin. The PTFE filler is contained within the PEEK thermoplastic resin at a level of from 5% to 50% by weight, with a preferred range of composition of the PTFE filler being from 15% to 40% by weight. Suitable compounds include XP-93 (30% PTFE filled PEEK) produced by Ensinger Special Polymers, and LL-4040 (20% PTFE filled PEEK) produced by LNP Engineering Plastics, Inc.

The injection molding allows for accurate control of the dimensions and shape of the main housing and the brush holder. The injection molding process selected, and the equipment used to perform the process, may be any of the known processes and equipment which are deemed suitable for this application by those skilled in the art.

As known generally, in an injection molding process the molding compound is first heated to make it flowable and when molten it is injected under pressure in the range of from 10,000 to 30,000 psi into a metal mold, or die having the desired features of the housing. The actual pressure is determined by the fluidity of the material. The molten material is held under pressure until the PTFE/PEEK mass has hardened sufficiently to be removed from the mold without distortion. During this hardening time the mold temperature must be maintained below the softening point of the material so as to allow hardening, but it must be high enough to prevent shrinkage of the molded compound housing due to hardening of the outside skin too quickly.

As shown in FIGS. 3 and 5 the brush holder 48 includes a plurality of brush pockets, or brush chambers, 80–85 which, as shown in further detail in FIG. 4, are formed through the body holder from a contact surface 86 (FIG. 3) to a mounting surface 88 (FIG. 5). In the present embodiment the pockets 80–85 are arrayed in a two row, three column matrix substantially similar to the array of the keyways 58–63 in the main housing, to provide registration of the pockets and keyways when the holder 48 is inserted into the recess 50. The brush pockets 80–85 each have an associated access slot 90–95 which facilitate the installation and removal of individual springs which, as described more fully in FIG. 4, bias each brush with a spring load to maintain the contact end of the brush against the associated slip ring surface.

In the present embodiment, the pockets 80–85 each have a hexagonal cross section which is adapted to receive, in a slidably engaging manner, a corresponding hexagonal shaped brush, as shown in FIG. 3 by the brush 98. To facilitate the illustration and description of the holder's features only one brush is shown installed. However, as understood, in operation there are brushes installed in each of the pockets 80–85. The brushes used in the present embodiment are of a known type, preferably comprising a copper-graphite composition, and they are available in various body style geometry. A commonly used configuration is the illustrated hexagonal cross section in which the hex flat portions are approximately 0.5 inches wide and the overall brush length is approximately one inch. It should be understood, however, that the brush material composition and the brush body geometry is selectable for a given deicing system application, and that the brush pocket cross sectional geometry would necessarily conform to the selected shape brush.

FIG. 4 is a sectioned view of a portion of the assembly 44 taken along the line 4—4 of FIGS. 3 and 5, and depicting the brush holder 48 seated within the recess portion 50 and secured to the main housing by removable fasteners, such as screws 100 which are fitted through holes 102 in the holder and secured in threaded holes 104 in the backplate 56 of the main housing. The sectioned view includes the brush pocket 82 of the brush holder 48, the keyway 60 of the main housing 46, and the brush 98. The pocket is formed through the holder body, from the contact surface 86 (FIG. 3) to the mounting surface 88 (FIG. 5). With the brush holder seated in the recess 50 (FIG. 3) the mounting surface 88 of the holder abuts the backplate 56 of the main housing such that the pocket 82 is substantially in register with the keyway 60. The brush 98 is installed in the pocket 82 and extends substantially through the pocket to the mounting surface 88. The inserted portion of the brush body, however, is entirely enclosed within the pocket and not the keyway, ensuring that the body surface is only in contact with the PTFE filled PEEK material so as to minimize abrasion.

During operation of the housing assembly 44 (installed on the bracket 43) the main housing interface surface 52 and holder contact surface 86 are substantially aligned in the same plane, which is displaced from the surface of the slip rings at the clearance distance necessary to prevent interference between the housing and the rotating slip rings; typically from 0.090 inches to 0.120 inches (approximately 0.229 cm to 0.305 cm). It may be preferable to have the contact surface 86 project slightly from the plane of the interface surface 52 to ensure that there is no fit interference from the housing. The brush 98 extends through this displacement distance and a contact end 106 of the brush is held against the slip ring surface 108 by the force exerted against the body's distal end 110 by a spring 112 nested within the keyway 60. In the disclosed embodiment the spring coil is held in contact with the distal end 110 by a spring base portion 114 having a locking portion 116 extending into the access slot 92. An integral finger portion 118 is displaced at an angle of from 100 to 170 degrees from the base 114 and engages a detent 120 within the recess 92, thereby fixing the spring 112 in position within the keyway 60.

The distal end of the brush is mechanically and electrically connected to an electrical conductor 122 which in the best mode embodiment is fitted at the opposite end with a clip 124 adapted to engage an associated one of a plurality of mountings 126, which are disposed within the column recess 67 (FIG. 5) associated with the keyway 60. There is one mounting 126 for each of the two keyways associated with the pair of brushes in contact with a common slip ring. In the present embodiment the associated keyways are 58, 61 and 59, 62 and 60, 63. The mountings are of a known type which mechanically captures and electrically connects the brush conductors, such as the conductor 122, with associated ones of a plurality of current signal conductors, such as the conductor 128, which are routed through the main housing 46 to provide an electrical signal path from the connector 78 to each of the mountings 126.

As known, deicing of the propellers must occur symmetrically to prevent imbalance in the blade assembly. This means that either all of the blades are deiced simultaneously or that there is intermittent deicing of groups of opposing blades simultaneously. Since aircraft power supplies are heavy it is desirable to minimize the deicing power requirements. Therefore, in the present embodiment for the four bladed assembly 12 (FIG. 1) the heaters for opposing blades are electrically connected in pairs. Depending on the rated output of the aircraft's power source, this allows for either the simultaneous energizing of all heaters or the intermittent energizing of alternate pairs of heaters in a substantially 50% duty cycle.

Similarly, it is desirable to minimize the current density of the contact end surface. Current density is expressed in amperes/square inch, and the square inch area refers to the total contact area between the brush and the slip ring. By having two brushes supply each slip ring the current load is substantially divided between the brushes, lowering the current density for each brush in the pair and extending the operating life of the brush contact surface. In addition, the redundancy of having two brushes associated with each slip ring provides greater system reliability in that if one brush fails the second brush can carry the load.

Figure 6:
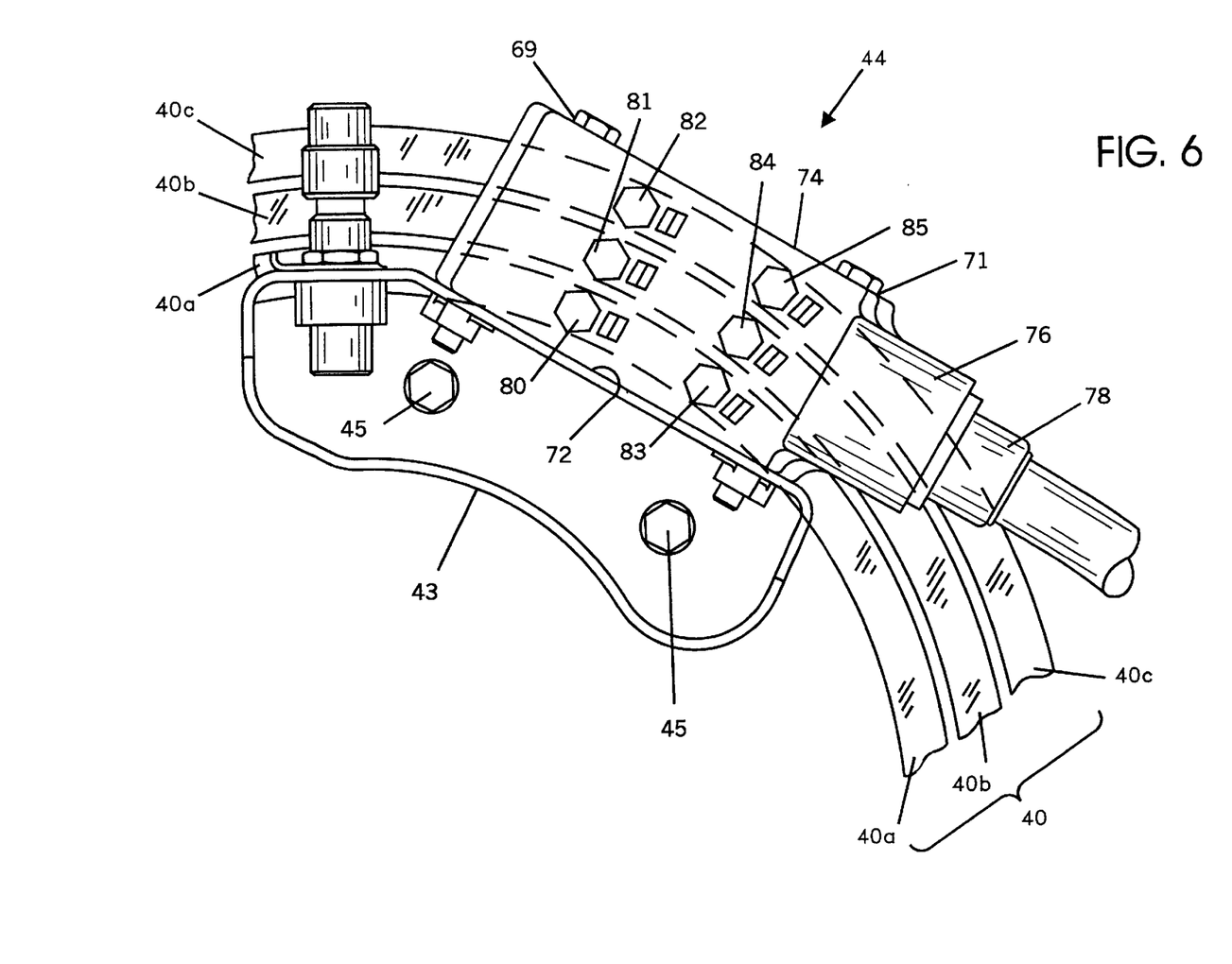
FIG. 6, is a figurative illustration of the brush block assembly of FIGS. 3, 5 as installed in the propeller assembly of FIG. 1.
Figure 7:
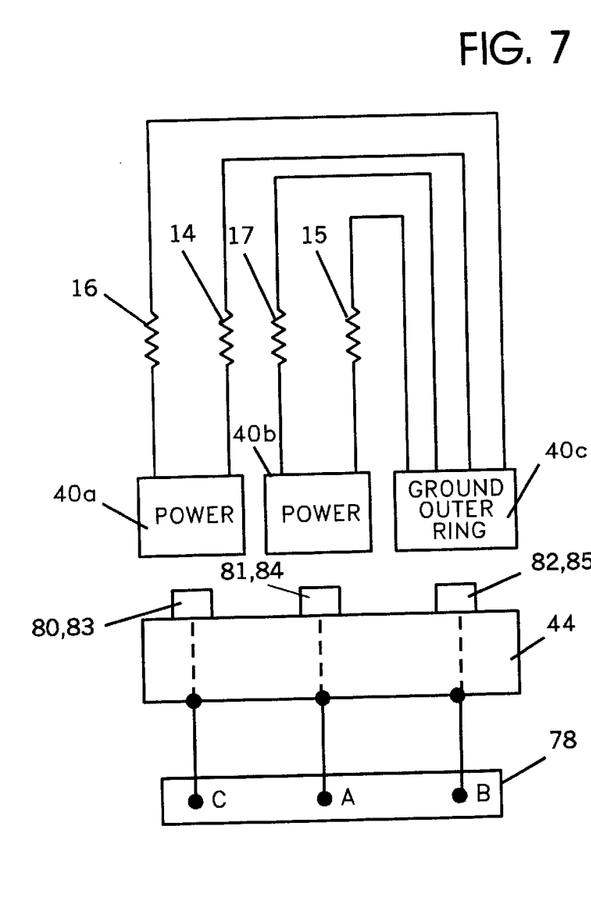
FIG. 7, is a functional schematic diagram which is associated with the illustration of FIG. 6.

Therefore, in the present system embodiment there are two brushes in contact with each slip ring and each slip ring is electrically connected to two heaters. Referring now to FIGS. 6 and 7. FIG. 6 figuratively depicts the installed assembly 44 as a transparency, viewed from the connection surface 66 (FIG. 5) but without showing the recesses 67, in order to facilitate illustration of the registration of the pocket 80–85 with the slip rings 40(*a*)–40(*c*). FIG. 7 is a simplified schematic illustration of the deicing system for the four bladed propeller system 12. The reference numerals in FIGS. 6 and 7 correspond, where applicable, to the system elements which they represent. The brush pairs associated with the pockets 80, 83 are in register with slip ring 40(*a*), which is electrically connected to heaters 22, 24 of opposing blades 14, 16 (FIG. 1). The brushes associated with pockets 81, 84 are in register with slip ring 40(*b*), which is electrically connected to heaters 23, 25 of opposing blades 15, 17. The low potential sides of all the heaters 22–25 are electrically connected to slip ring 40(*c*), which is in register with the brushes associated with pockets 82, 85.

The present brush holder material was selected for its combination of good electrical insulating capability and good mechanical wear characteristics, while the main housing material may be an alternative, non-insulating material chosen for its suitable structural strength. This reduces the cost of the overall assembly by limiting the use of the more expensive PTFE filled PEEK to that portion of the assembly which houses the brushes. Similarly, since the brush holder insert is removable, it is replaceable separate from the main housing, thereby reducing maintenance costs.

The PEEK compound has naturally good wear characteristics while PTFE (commonly referred to as TEFLON, a registered trademark of the Dupont Corporation) provides additional lubrication to any wear surfaces that may occur within the brush pocket, thereby minimizing further erosion. Further desirable characteristics of the PTFE filled PEEK molding compound are good chemical resistance, temperature resistance, and strength.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Apparatus for deicing the surface of propeller blades disposed in a spinner assembly mounted to and rotatable with the shaft of an engine installed on an aircraft, the aircraft having an electrical power source, comprising:

rotational interface means, adapted to be fixedly mounted to and rotatable with the spinner assembly, and including one or more substantially annular slip rings disposed on an interface surface thereof;

heater elements, at least one disposed on each propeller blade and each electrically connected to an associated one of said slip rings; and a brush block assembly, adapted for installation in proximity to said rotational interface means and having one or more brush pockets for securing a like number of electrically conductive brushes in contact registration with the rotating surface of said rings; and brush block assembly being responsive to the aircraft power source for providing an electrical current signal therefrom to each brush;

as characterized by:

said brush block assembly comprising a main housing a removable brush block holder, said main housing having an interface recess portion adapted to releasably engage said brush holder, said brush being formed from a thermoplastic molding compound comprising an organic polytetrafluoroethylene (PTFE) filler distributed within a polyetheretherketone (PEEK thermoplastic resin and adapted to secure, when engaged in the recess portion, said electrically conductive brushes in contact registration with the surface of said slip rings.

2. The apparatus of claim 1, wherein the material characteristics of said main housing is selectable in dependence on the structural requirements associated with installation of the brush block assembly in proximity to said rotational interface.

3. The apparatus of claim 1 wherein said brush block holder thermoplastic molding compound contains PTFE at a level of from substantially 5% to substantially 50% by weight.

4. The apparatus of claim 1 wherein said brush block holder thermoplastic molding compound contains PTFE at a level of from substantially 15% to substantially 40% by weight.

5. The apparatus of claim 3 wherein said brush block holder thermoplastic molding comprises 20% PTFE filled PEEK.

6. The apparatus of claim 3 wherein said brush block holder thermoplastic molding comprises 30% PTFE filled PEEK.

7. The brush block assembly of claim 6 wherein the material characteristics of said main housing are selectable in dependence on the structural requirements associated with installation of the brush block assembly in proximity to said rotational interface.

8. A brush block assembly, for use in a propeller deicing system in providing electrical signals from a stationary power source to heater elements mounted on the propeller blades of a rotating spinner assembly, the heater elements being electrically connected to slip rings disposed in a slip ring pattern on a spinner assembly rotational interface, comprising:

a brush holder, formed from a thermoplastic molding compound comprising an organic polytetrafluoroethylene (PTFE) filler distributed within a polyetheretherketone (PEEK) thermoplastic resin, and having one or more brush pockets bored between first and second major surfaces which are spaced apart at a first distance, said pockets being arrayed in a brush pattern and each being adapted to receive an electrically conductive brush, and a main housing, being adapted for operational installation in a manner which places an interface surface thereof in proximity to the rotational interface said interface, surface having one or more keyways disposed therein and being adapted to releasably engage said brush holder in a manner which provides registration of said brush pockets with said keyways, thereby providing for the contact registration of brushes installed in said pockets with the rotating surface of said slip rings.

9. The brush block assembly apparatus of claim 8 wherein said brush block assembly thermoplastic molding compound contains PTFE at a level of from substantially 5% to substantially 50% by weight.

10. The brush block assembly of claim 8 wherein said brush holder thermoplastic molding compound contains PTFE at a level of from substantially 15% to substantially 40% by weight.

11. The brush block assembly of claim 10 wherein said brush holder thermoplastic molding comprises 20% PTFE filled PEEK.

12. The brush block assembly of claim 10 wherein said brush holder thermoplastic molding comprises 30% PTFE filled PEEK.

* * * * *